Figures 1, 2:
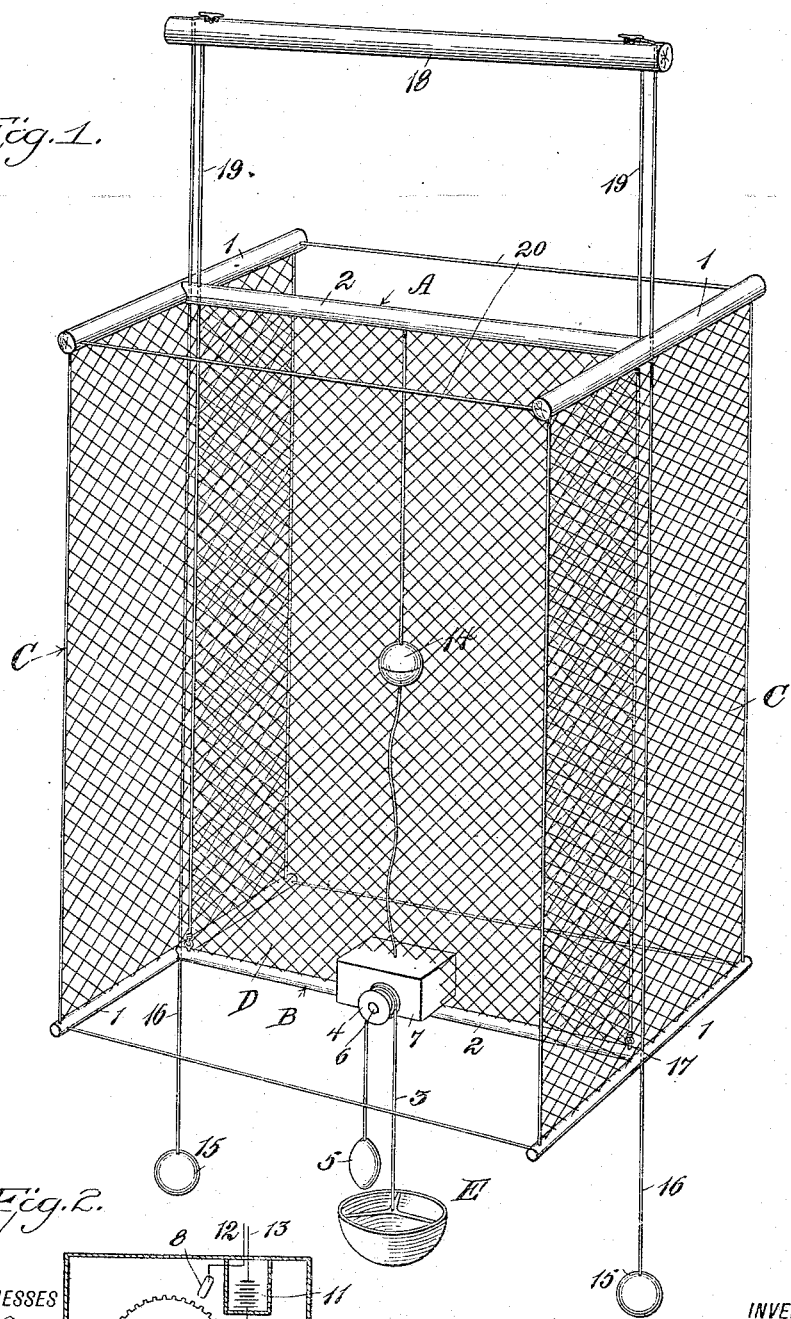

L. D'AMICO.
SUBMARINE DESTROYING TRAP.
APPLICATION FILED OCT. 5, 1917.

1,278,602.

Patented Sept. 10, 1918.

WITNESSES
O. K. Holmes
C. Bradway

INVENTOR
L. D'Amico
BY
ATTORNEYS

UNITED STATES PATENT OFFICE.

LUIGI D'AMICO, OF NEW YORK, N. Y.

SUBMARINE-DESTROYING TRAP.

1,278,602.

Specification of Letters Patent.   Patented Sept. 10, 1918.

Application filed October 5, 1917.   Serial No. 194,885.

*To all whom it may concern:*

Be it known that I, LUIGI D'AMICO, a subject of the King of Italy, and a resident of the city of New York, borough of the Bronx, in the county of the Bronx and State of New York, have invented a new and Improved Submarine-Destroying Trap, of which the following is a full, clear, and exact description.

This invention relates to a trap of that type which embodies a submerged net with which submarines or surface floating crafts may become enmeshed so that by means of a drag device an electric fuse circuit will be closed so as to fire off a mine carried by the trap.

The invention has for its general objects to improve and simplify the construction and operation of traps of this character so as to be reliable and efficient in use, comparatively simple and inexpensive to manufacture, easy to set up in operative position in the water, and so designed as to more readily insure the enmeshing of a boat in the net of the trap if the boat comes in contact therewith.

A more specific object of the invention is the provision of a novel arrangement of vertically disposed nets carried by a buoyant structure fully or partially submerged in the water, the nets being so arranged that a submarine will become enmeshed therewith irrespective of the angle of approach, and by reason of the trap being caught on the submarine, a switch is closed to set off the mine.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in both the views, Figure 1 is a perspective view of the trap; and Fig. 2 is a detail view showing the ignition circuit-closing switch for the fuse that fires the mine.

Referring to the drawing, the trap is composed of upper and lower frames A and B which are disposed horizontally and are in the form of the letter H consisting of parallel end bars 1 and a central connecting bar 2, which may be wooden poles or timbers. The body of the trap is formed of end nets C and a central net D. Each end net extends from an end member 1 of the top frame A, corresponding to the end member 1, of the lower frame B, and the net D, which lies between the nets C, extends from the member 2 of the top frame to the corresponding member 2 of the lower frame. In other words, the body of the trap is formed of two chambers opening in opposite directions, so that if a submarine or other boat should strike the net by entering between the wings formed by the nets C, the trap will become enmeshed or caught on the bow of the submarine and the whole trap dragged along with it, and furthermore, if the submarine should strike the sides of the trap formed by the nets C, the trap would be caused to follow along with the submarine.

Suspended from the trap is a drag device or anchor E, which normally hangs vertically from the trap by means of a cable 3 which winds around a drum 4 and has a counterbalancing weight 5 of small mass compared with the drag device E. The drum is arranged on a shaft 6 which extends into a water-tight switch box 7 supported on the lower frame B in any suitable manner. In the switch box is a fixed contact 8 and a movable contact 9 which is operated by the drum shaft 6 through gears 10. In the switch box may be arranged a source of current 11. Wires 12 and 13 connect the battery and switch contacts with a mine 14 suitably carried by the net, and in this mine is a suitable ignition device which is fired when the circuit is closed by the contact 9 engaging the contact 8. The firing of the mine is produced by a boat striking the trap and causing it to be moved out of its normal position. The drag device E serves to resist movement, and consequently the cable 3 turns the drum 4, which in turn causes the switch contacts to close the circuit.

Any suitable means may be employed to hold the trap in upright position. In the present instance weights 13 are suspended below the trap by cables 16, which pass through apertures 17 in the frames A and B, and the upper ends of the cable are connected with a floating beam or other structure 18. By adjusting the relative position of the float to the trap, or the weights to the trap, the degree of submergence of the trap may be varied. The body of the trap is also connected with the float 18 by cables 19.

In case it is desired to arrange the trap close to the surface and still prevent friendly floating vessels from striking the trap and causing them to be dragged, guard wires or cables 20 may be stretched across the top and bottom of the trap from the ends of one side member 1 to the other. These guards 20 prevent the bow of a boat from entering between the side nets C, and if the bow of a boat strikes a guard wire, it will simply sway the trap to one side or the other, or otherwise deflect it far enough to permit the boats to pass thereover.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. Trap of the class described comprising upper and lower frames, and a plurality of vertical nets connecting the frames, said nets being arranged in fixed angular relation to each other for enmeshing with a boat striking the net at any angle of approach.

2. A trap of the class described comprising upper and lower horizontal frames of H-form, a pair of parallel nets connecting the corresponding ends of the frames together, and a third net disposed centrally between the first-mentioned nets in right-angular relation thereto and connected with the frames.

3. A trap of the class described comprising upper and lower frames each composed of a plurality of connected members arranged at an angle to each other, and vertical nets connecting corresponding frame members together, whereby the nets are fixedly arranged at an angle to each other.

4. A trap of the class described comprising upper and lower frames each composed of a plurality of connected members arranged at an angle to each other, vertical nets connecting corresponding frame members together, whereby the nets are arranged at an angle to each other, weighting means connected with the bottom of the trap, float means connected with the top of the trap, a mine carried by the trap, a drag device suspended from the trap, and a circuit closer arranged on the lower frame and operated by the drag device to fire the mine when a boat strikes and drags the trap.

LUIGI D'AMICO.

Copies of this patent may be obtained for five cents each, by addressing the "Commissioner of Patents, Washington, D. C."